(12) United States Patent
Sung et al.

(10) Patent No.: US 12,032,154 B2
(45) Date of Patent: Jul. 9, 2024

(54) DISPLAY APPARATUS INCLUDING VISION CORRECTION LENS

(71) Applicant: SAMSUNG ELECTRONICS CO., LTD., Suwon-si (KR)

(72) Inventors: Geeyoung Sung, Daegu (KR); Changkun Lee, Seoul (KR); Hongseok Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 490 days.

(21) Appl. No.: 17/402,064

(22) Filed: Aug. 13, 2021

(65) Prior Publication Data

US 2022/0236565 A1  Jul. 28, 2022

(30) Foreign Application Priority Data

Jan. 26, 2021  (KR) .................. 10-2021-0010801

(51) Int. Cl.
*G02B 27/01* (2006.01)
*G02B 27/00* (2006.01)
*G03H 1/22* (2006.01)

(52) U.S. Cl.
CPC ..... *G02B 27/0068* (2013.01); *G02B 27/0025* (2013.01); *G02B 27/0101* (2013.01); *G02B 27/017* (2013.01); *G02B 27/0172* (2013.01); *G03H 1/2294* (2013.01); *G02B 2027/0127* (2013.01); *G02B 2027/0129* (2013.01); *G02B 2027/0178* (2013.01); *G02B 2027/0181* (2013.01); *G02B 2027/0185* (2013.01)

(58) Field of Classification Search
CPC ........ G02B 2027/0178; G02B 27/0172; G02B 27/017
See application file for complete search history.

(56) References Cited

U.S. PATENT DOCUMENTS

| | | | |
|---|---|---|---|
| 10,319,154 | B1 | 6/2019 | Chakravarthula et al. |
| 10,816,825 | B2 | 10/2020 | Yoshida |
| 2016/0161740 | A1 | 6/2016 | Bar-Zeev et al. |
| 2020/0174284 | A1 | 6/2020 | Chan et al. |
| 2021/0003967 | A1 | 1/2021 | Kim et al. |

FOREIGN PATENT DOCUMENTS

| | | |
|---|---|---|
| DE | 10 2020 109 794 A1 | 10/2020 |
| KR | 10-1852680 B1 | 4/2018 |
| WO | 2012/064546 A1 | 5/2012 |
| WO | 2019/012385 A1 | 1/2019 |
| WO | 2022/010070 A1 | 1/2022 |

OTHER PUBLICATIONS

Communication dated Mar. 7, 2022 issued by the European Patent Office in European Patent Application No. 21200225.7.

*Primary Examiner* — Ryan D Howard
(74) *Attorney, Agent, or Firm* — Sughrue Mion, PLLC

(57) ABSTRACT

Provided is a display apparatus including a vision correction lens. The display apparatus may include: an image forming device configured to form a virtual image; a vision correction lens configured to correct eyesight of a viewer; a combiner configured to mix the virtual image with light containing an outside landscape and having passed through the vision correction lens and provide the viewer with the virtual image and the light that are mixed with each other; and a virtual image positioner configured to adjust, according to a state of eyes of the viewer, a depth of a virtual image plane at which the virtual image is viewed, wherein the combiner may be arranged between the vision correction lens and the eyes of the viewer.

20 Claims, 11 Drawing Sheets

DISPLAY APPARATUS INCLUDING VISION CORRECTION LENS

CROSS-REFERENCE TO RELATED APPLICATION

This application is based on and claims priority under 35 U.S.C. § 119 to Korean Patent Application No. 10-2021-0010801, filed on Jan. 26, 2021, in the Korean Intellectual Property Office, the disclosure of which is incorporated by reference herein in its entirety.

BACKGROUND

1. Field

The disclosure relates to a display apparatus including a vision correction lens and capable of adjusting, according to a state of viewer's eyes, the depth of a virtual image plane at which a virtual image is viewed.

2. Description of the Related Art

Head mounted display devices providing virtual reality (VR) have been commercially available and widely used in the entertainment industry. Moreover, head mounted display devices have been developed into types of devices applicable to the fields of medicine, education, and other industries.

Augmented reality (AR) display devices, which are in some ways an advanced form of VR displays, are image devices combining the real world with VR and capable of bringing out interactions between reality and VR. The interaction between reality and VR is based on the function of providing real-time information about real situations, and the effect of reality is further increased by overlaying virtual objects or information on a real-world environment.

SUMMARY

Provided are display apparatuses including vision correction lenses.

Provided are display apparatuses capable of adjusting, according to a state of viewer's eyes, the depth of a virtual image plane at which virtual images are viewed.

Additional aspects will be set forth in part in the description which follows and, in part, will be apparent from the description, or may be learned by practice of the example embodiments of the disclosure.

According to an aspect of the disclosure, there is provided a display apparatus including an image forming device configured to form a virtual image; a vision correction lens configured to correct eyesight of a viewer; a combiner configured to mix the virtual image with a real-world image in a surrounding environment that passes through the vision correction lens and provide the viewer with the virtual image and the real-world image that are mixed with each other; and a virtual image positioner configured to adjust, according to a state of eyes of the viewer, a depth of a virtual image plane at which the virtual image is viewed, wherein the combiner is arranged between the vision correction lens and the eyes of the viewer.

The virtual image positioner may be configured such that the depth of the virtual image plane matches a depth of an object in the real-world image in the surrounding environment that is corrected by the vision correction lens.

The virtual image positioner may be configured to position the virtual image plane at a first distance from the eyes of the viewer based on a determination that the eyes of the viewer are myopic; position the virtual image plane at a second distance from the eyes of the viewer based on a determination that the eyes of the viewer are emmetropic, the second distance being greater than the first distance; and position the virtual image plane at a third distance from the eyes of the viewer based on a determination that the eyes of the viewer are hyperopic, the third distance being greater than the second distance.

The vision correction lens may be a lens having negative (−) refractive power, a flat plate having zero refractive power, or a lens having positive (+) refractive power.

The virtual image positioner may comprise a focusing optical system arranged between the image forming device and the combiner; a driving device configured to adjust a distance between the image forming device and the focusing optical system; and a processor configured to control the driving device, wherein the virtual image positioner is configured to adjust, according to the state of the eyes of the viewer, the depth of the virtual image plane at which the virtual image is viewed, and wherein the depth of the virtual image plane is determined based on a position of the image forming device with respect to the focusing optical system.

The image forming device may be movable along an optical axis of the focusing optical system between the focusing optical system and an object-side focal point of the focusing optical system.

The driving device may comprise an actuator configured to be operated by electrical control.

The driving device may further comprise a support configured to fix the actuator.

The support may be movable to adjust a position of the actuator.

The processor may be further configured to: store information on a plurality of discontinuous positions, and control the driving device to place the image forming device at one of the plurality of discontinuous positions according to the state of the eyes of the viewer.

The processor may be further configured to control the driving device to continuously vary the position of the image forming device according to the state of the eyes of the viewer.

The processor may be further configured to control the driving device to additionally adjust the position of the image forming device according to depth information about the virtual image based on the determined depth of the virtual image plane.

The processor may be further configured to provide the image forming device with a light modulation signal including information about the virtual image.

The image forming device may comprise: a light source configured to emit coherent illumination light; and a spatial light modulator configured to generate a holographic image by diffracting and modulating the illumination light.

The virtual image positioner may comprise a processor configured to generate a computer-generated hologram (CGH) signal containing image information about the virtual image and depth information about the virtual image and provide the CGH signal to the image forming device, wherein the virtual image positioner is configured to adjust, according to the state of the eyes of the viewer, the depth of the virtual image plane at which the virtual image is viewed.

The processor may be further configured to determine the depth of the virtual image plane according to the state of the eyes of the viewer, and change the CGH signal according to the determined depth of the virtual image plane.

The virtual image positioner may comprise a focusing optical system arranged between the image forming device and the combiner, wherein the focusing optical system is configured to transmit the virtual image in a state in which the virtual image is in focus at all depths regardless of the state of the eyes of the viewer.

The image forming device may be positioned at an object-side focal point of the focusing optical system.

The combiner may comprise a beam splitter configured to reflect, toward the eyes of the viewer, the virtual image formed by the image forming device, and transmit, toward the eyes of the viewer, the real-world image in a surrounding environment passed through the vision correction lens.

The combiner may comprise a light guide plate, and the light guide plate comprises an input coupler and an output coupler.

The image forming device may be arranged at a position corresponding to the input coupler of the light guide plate, and the vision correction lens is arranged at a position corresponding to the output coupler of the light guide plate.

The output coupler may be configured such that light obliquely incident on the output coupler from an inside of the light guide plate is output to an outside of the light guide plate, and light perpendicularly incident on the output coupler passes through the output coupler.

According to another aspect of the disclosure, there is provided a wearable electronic device comprising: an image forming device configured to form a virtual image; a vision correction lens configured to correct eyesight of a viewer, the correction lens having an outer surface facing a surrounding environment of the viewer and an inner surface facing eyes of the viewer; and a combiner arranged on the inner surface of the vision correction lens, the combiner configured to mix the virtual image from the image forming device with a real-world image in the surrounding environment that passes through the vision correction lens.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
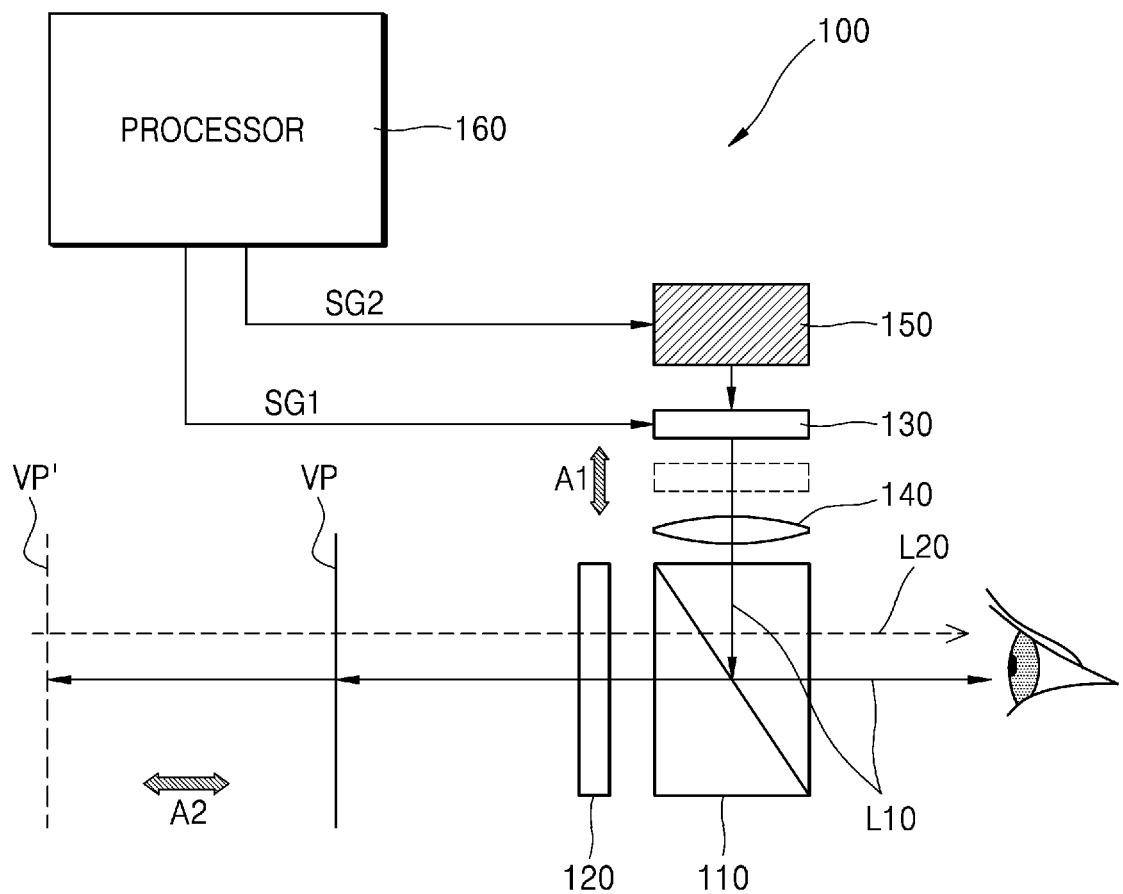
FIG. 1 is a conceptual view schematically illustrating a structure and operation of a display apparatus according to an example embodiment.

Reference will now be made in detail to example embodiments, which are illustrated in the accompanying drawings, wherein like reference numerals refer to like elements throughout. In this regard, the example embodiments may have different forms and should not be construed as being limited to the descriptions set forth herein. Accordingly, the example embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, display apparatuses including visual correction lenses will be described with reference to the accompanying drawings. In the drawings, like reference numerals refer to like elements, and the sizes of elements may be exaggerated for clarity of illustration. In addition, example embodiments described herein are for illustrative purposes only, and various modifications may be made therefrom.

In the following description, when an element is referred to as being "above" or "on" another element, it may be directly on the other element while making contact with the other element or may be above the other element without making contact with the other element. The terms of a singular form may include plural forms unless otherwise mentioned. It will be further understood that the terms "comprises" and/or "comprising" used herein specify the presence of stated features or elements, but do not preclude the presence or addition of one or more other features or elements.

An element referred to with the definite article or a demonstrative pronoun may be construed as the element or the elements even though it has a singular form. Operations of a method may be performed in an appropriate order unless explicitly described in terms of order or described to the contrary, and are not limited to the stated order thereof.

In the disclosure, terms such as "unit" or "module" may be used to denote a unit that has at least one function or operation and is implemented with hardware, software, or a combination of hardware and software.

As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Furthermore, line connections or connection members between elements depicted in the drawings represent functional connections and/or physical or circuit connections by way of example, and in actual applications, they may be replaced or embodied with various additional functional connections, physical connections, or circuit connections.

Examples or example terms are just used herein to describe technical ideas and should not be considered for purposes of limitation unless defined by the claims.

FIG. 1 is a conceptual view schematically illustrating a structure and operation of a display apparatus 100 according to an example embodiment. Referring to FIG. 1, the display apparatus 100 of the example embodiment may include an image forming device 130 configured to form a virtual image, a combiner 110 configured to mix a virtual image formed by the image forming device 130 with light corresponding to an outside landscape and provide the mixture to a viewer, a driving device 150 configured to adjust the distance between the image forming device 130 and the combiner 110, a processor 160 configured to control the image forming device 130 and the driving device 150 according to information on the depth of a virtual image to be displayed and a vision correction lens 120 configured to correct the eyesight of a viewer.

The image forming device 130 forms a virtual image to be provided to the viewer by modulating light according to information on the virtual image. Virtual images formed by the image forming device 130 may be, for example, stereoscopic images which are respectively provided to the left eye and the right eye of the viewer, holographic images, light field images, or integral photography (IP) images, and may include multi-view images or super multi-view images. In addition, images formed by the image forming device 130 may be two-dimensional images. However, the disclosure is not limited to general two-dimensional images.

The image forming device 130 may include, for example, a liquid crystal on silicon (LCoS) device, a liquid crystal display (LCD) device, an organic light emitting diode (OLED) display device, or a digital micromirror device (DMD). In addition, the image forming device 130 may include a next-generation display device such as a micro-LED display device or a quantum dot (QD) LED display device. When the image forming device 130 is a self-emissive display device such as an OLED display device or a micro-LED display device, the image forming device 130 may include only one display panel. However, when the image forming device 130 is a non-emissive display device such as an LCoS device or an LCD device, the image forming device 130 may further include a light source configured to provide illumination light and a beam splitter configured to adjust the path of illumination light.

The combiner 110 may not only transmit light L10 containing a virtual image formed by the image forming device 130 to a viewer's eye, but may also transmit light L20 corresponding to an outside landscape to the viewer's eye. That is, the light L20 may be light from the real world objects in the outside landscape. For instance, the outside landscape may be the surrounding environment in front of the viewer's eye. For example, the combiner 110 may be a beam splitter configured to transmit a portion of incident light and reflect the other portion of the incident light. When the light L10 containing the virtual image formed by the image forming device 130 has polarization characteristics, the combiner 110 may be a polarization beam splitter configured to transmit or reflect incident light according to the polarization direction of the incident light. The combiner 110 may reflect the light L10 containing the virtual image toward the viewer's eye and may transmit the light L20 containing the outside landscape toward the viewer's eye.

According to an example embodiment, the light L20 from the outside may not be from an artificial image displayed on a separate display device, but contains an actual real world foreground existing in front of the viewer. Therefore, the viewer may simultaneously perceive the virtual image artificially generated by the image forming device 130 and the actual foreground. Therefore, the display apparatus 100 may function as a see-through-type display. In this regard, the display apparatus 100 of the example embodiment may be used for implementing augmented reality (AR) or mixed reality (MR). For example, the display apparatus 100 of the example embodiment may be a near-eye AR display apparatus.

In addition, the combiner 110 is not limited to the shape and the structure shown in FIG. 1. As such, according to another example embodiment, the combiner 110 may have a different shape or a different structure. Additional optical elements may be further provided to transmit an image formed by the image forming device 130 to a viewer's pupil together with a real-environment image of the front side of the viewer, and optical windows having various shapes and structures may be employed.

The display apparatus 100 may further include a focusing optical system 140 configured to focus a virtual image. In FIG. 1, the focusing optical system 140 is simply illustrated as a single lens, but the disclosure is not limited thereto. As such, according to another example embodiment, the focusing optical system 140 may include a plurality of lenses to compensate for aberration and distortion. The focusing optical system 140 may be arranged in a path of the light L10 containing the virtual image, and thus the light L20 containing the outside landscape may not be affected by the focusing optical system 140. For example, the focusing optical system 140 may be arranged between the image forming device 130 and the combiner 110. Then, the viewer may perceive a virtual image formed on a virtual image plane VP formed at a predetermined position in front of the viewer, and may differently feel the depth of the virtual image according to the position of the virtual image plane VP.

The display apparatus 100 of the example embodiment may vary the position of the virtual image plane VP to reflect the depth of a virtual image to be displayed rather than fixing the position of the virtual image plane VP. To this end, the display apparatus 100 may include the driving device 150 configured to vary the position of the image forming device 130. The driving device 150 may translate the image forming device 130 such that the distance between the image forming device 130 and the focusing optical system 140 may vary. When the position of the image forming device 130 is varied in directions A1, the position of the virtual image plane VP may be varied in directions A2. For example, when the image forming device 130 is moved away from the focusing optical system 140, the depth of a virtual image that the viewer feels may be increased by a distance from the virtual image plane VP to a virtual image plane VP'. In other words, the virtual image may be moved away from the viewer from the virtual image plane VP to the virtual image plane VP'. Conversely, when the image forming device 130 is moved closer to the focusing optical system 140, the virtual image may be moved closer to the viewer.

The processor 160 may generate a light modulation signal SG1 and a driving signal SG2 which are to be respectively transmitted to the image forming device 130 and the driving device 150 according to information about a virtual image that the viewer will recognize. The image forming device 130 and the driving device 150 may be controlled respectively by the light modulation signal SG1 and the driving signal SG2 generated by the processor 160. For example, the image forming device 130 forms a virtual image based on the light modulation signal SG1 provided from the processor 160. In addition, the driving device 150 adjusts the position of the image forming device 130 based on the driving signal SG2 provided from the processor 160 such that the virtual image plane VP may be positioned in accordance with the depth of the virtual image formed by the image forming device 130. To this end, the processor 160 may generate the driving signal SG2 by determining the distance between the image forming device 130 and the focusing optical system 140 based on information about the depth of the virtual image which is included in the light modulation signal SG1 to be transmitted to the image forming device 130.

For each of multi-frame virtual images to be provided to the viewer, image information may include pixel-specific data, related to color values of a plurality of pixels and depth information associated with positions of the virtual image plane VP at which virtual images are respectively to be formed. The processor 160 may generate, as the light modulation signal SG1, an electrical signal for implementing color values determined by referring to the pixel-specific data included in the image information. In addition, the processor 160 may generate the driving signal SG2 to control a placement of the image forming device 130 such that the virtual image plane VP may be formed at a position corresponding to a representative depth value which is set with reference to the depth information. When the light modulation signal SG1 and the driving signal SG2 which are generated by the processor 160 are respectively transmitted to the image forming device 130 and the driving device 150, the viewer may recognize a virtual image from the position of the virtual image plane VP which corresponds to the depth of the virtual image.

In addition, the driving signal SG2 for driving the driving device 150 may be transmitted after being delayed by a time from the transmission of the light modulation signal SG1. For example, a predetermined delay time may be set to be equal to or greater than the accommodation-vergence time of the viewer's eye. Accordingly, the delay time takes into account the time necessary for the human eye to perceive an image at a varied depth position.

The vision correction lens 120 may have refractive power to correct the eyesight of the viewer. For example, the vision correction lens 120 may be a concave lens having a negative (−) refractive power when the viewer's eye is myopic, and may be a convex lens having a positive (+) refractive power when the viewer's eye is hyperopic. In addition, when the viewer's eye is emmetropic, the vision correction lens 120 may be a flat plate which does not have refractive power.

As shown in FIG. 1, the vision correction lens 120 is positioned at an outer side of the display apparatus 100, and the combiner 110 is positioned at the viewer's eye side. In other words, the combiner 110 may be arranged between the vision correction lens 120 and the viewer's eye. Therefore, the combiner 110 transmits, toward the viewer's eye, light L20 containing an outside landscape and having passed through the vision correction lens 120. However, light L10 containing a virtual image does not pass through the vision correction lens 120.

According to the example embodiment, compared to the case in which a combiner is positioned at an outer side of a display apparatus and a vision correction lens is positioned on a viewer's eye side, the combiner 110 is positioned relatively close to the viewer's eye, and thus a wide field of view (FOV) may be guaranteed. In addition, when a combiner is positioned at an outer side of a display apparatus, an additional case design may be required to hide the combiner from the outside of the display apparatus, and thus the price and weight of the display apparatus may increase. However, in the display apparatus 100 of the example embodiment, the combiner 110 is covered by the vision correction lens 120, an additional case design is not required to hide the combiner 110.

In addition, the viewer may clearly see the outside landscape through the vision correction lens 120. In addition, the viewer may see virtual images with the naked eye without the vision correction lens 120 being involved. Since virtual images are not affected by the vision correction lens 120, it may be easy to determine the position of the virtual image plane VP. Moreover, it may be easy to adjust the depth of the virtual image plane VP according to the state of the viewer's eye such as myopia, hyperopia, or presbyopia. However, when a combiner is positioned at an outer side of a display apparatus, it may be difficult to adjust the focus of a virtual image formed close to a presbyopic viewer's eye.

For example, FIGS. 2 to 5 are conceptually views illustrating examples of adjusting the depth of a virtual image plane according to the state of a viewer's eye.

Figure 2:
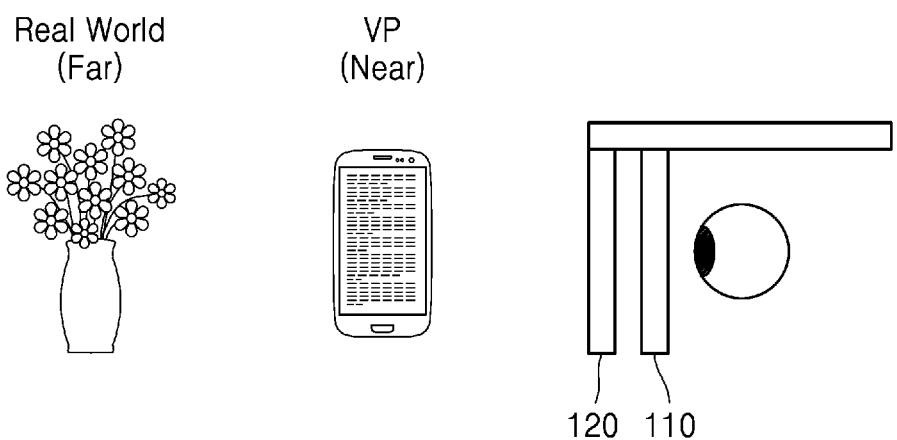
FIGS. 2 to 5 are conceptual views illustrating examples of adjusting the depth of a virtual image plane according to the state of viewer's eyes.

First, a viewer having myopia or myopic presbyopia wears myopia glasses to see a distant object and takes off the myopia glasses to see a nearby object. Therefore, when a viewer has myopia or myopic presbyopia, as shown in FIG. 2, the processor 160 and the driving device 150 may adjust the position of the image forming device 130 to bring the virtual image plane VP closer to a viewer's eye. Then, the viewer may clearly see a virtual image with the naked eye and an outside landscape through the vision correction lens 120.

Figure 3:
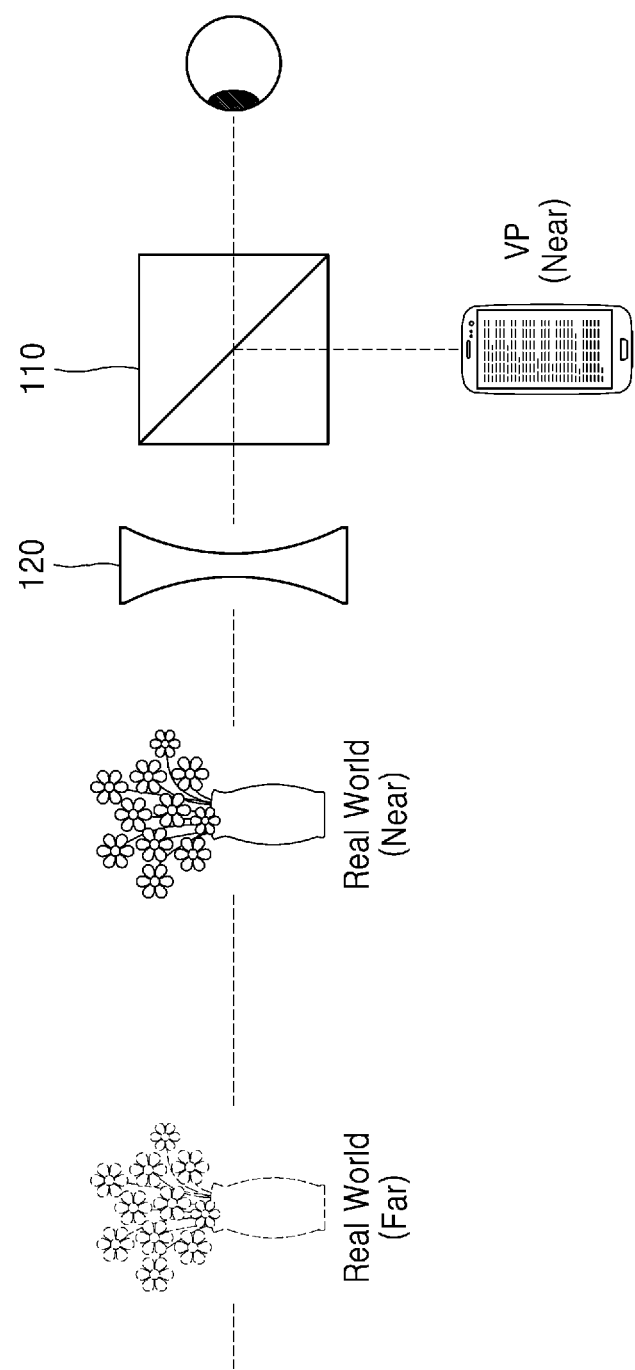

Eyestrain may be prevented by adjusting the depth of a virtual image as described above. Referring to FIG. 3, a concave lens is used as the vision correction lens 120, and in this case, a distant object in an actual outside landscape is brought closer to the eye. The processor 160 and the driving device 150 may position the virtual image plane VP at a depth substantially equal to the depth of the object in the outside landscape which is corrected by the vision correction lens 120. Therefore, since the depth of a virtual image and the depth of the object in the outside landscape are substantially the same, the eye may not have accommodation-vergence difference between the virtual image and the object in the outside landscape, and thus eyestrain may be prevented.

Figure 4:
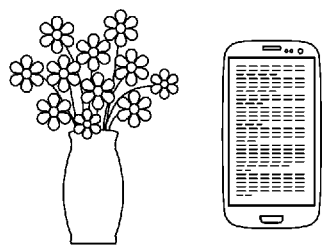
Figure 4:
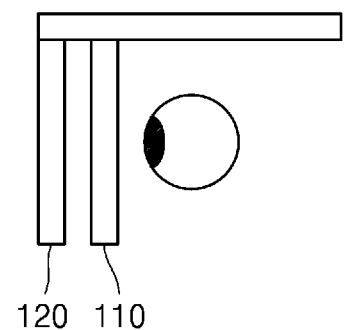

In addition, a viewer having emmetropic presbyopia does not usually wear glasses but wears reading glasses when viewing nearby objects. In this case, as shown in FIG. 4, the processor 160 and the driving device 150 may adjust the position of the image forming device 130 to place the virtual image plane VP at a distance of approximately 1 m from a viewer's eye. The viewer may see an outside landscape through the vision correction lens 120 which is of a flat type having no refractive power, and may see a virtual image formed at a distance of approximately 1 m with the naked eye.

Figure 5:
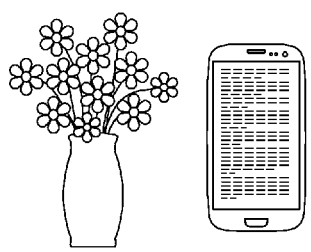
Figure 5:
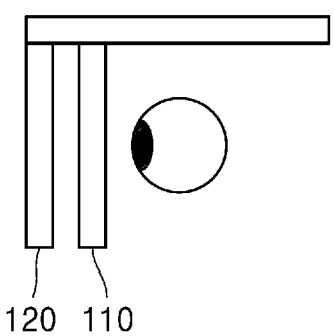

In addition, a viewer having hyperopia and hyperopic presbyopia wears convex lenses having positive refractive power. In this case, as illustrated in FIG. 5, the virtual image plane VP may be positioned farther from a viewer's eye than from a viewer's eye having emmetropic presbyopia. For example, the processor 160 and the driving device 150 may adjust the position of the image forming device 130 to position the virtual image plane VP at a distance of about 2 m to about 3 m from the viewer's eye.

As described above, while a viewer sees an object in an actual landscape through the vision correction lens 120, the processor 160 and the driving device 150 may vary the position of the virtual image plane VP within a range in which the viewer may see virtual images with the naked eye according to the state of the eyes of the viewer. In this regard, the processor 160, the driving device 150, and the focusing lens 140 may function as a virtual image positioner that adjusts, according to viewer's eye states, the depth of the virtual image plane VP at which virtual images are viewed. Owing to the virtual image positioner, the depth of an object in an outside landscape which is corrected by the vision correction lens 120 may match the depth of the virtual image plane VP. For example, the virtual image positioner may position the virtual image plane VP such that: when a viewer's eye is myopic, the virtual image plane VP may be positioned at a first distance from the viewer's eye; when the viewer's eye is emmetropic, the virtual image plane VP may be positioned at a second distance from the viewer's eye which is greater than the first distance; and when the viewer's eye is hyperopic, the virtual image plane VP may be positioned at a third distance from the viewer's eye which is greater than the second distance.

In addition, the expression of depths associated with information on the depths of virtual images to be displayed may be performed based on the position of the virtual image plane VP which is determined according to the state of a viewer's eye. For example, when the viewer's eye is myopic, the depth of a virtual image may be expressed at about the first distance from the viewer's eye. In other words, a virtual image having a large depth may be formed at a position distant from the viewer's eye by more than the first distance, and a virtual image having a small depth may be formed at a position distant from the viewer's eye by less than the first distance. Likewise, when the viewer's eye is emmetropic, the depth of a virtual image may be expressed at about the second distance from the viewer's eye, and when the viewer's eye is hyperopic, the depth of a virtual image may be expressed at about the third distance from the viewer's eye. For example, the processor 160 may control the driving device 150 to additionally adjust the position of the image forming device 130 according to information on the depth of a virtual image based on the determined depth of the virtual image plane VP.

Figure 6A:
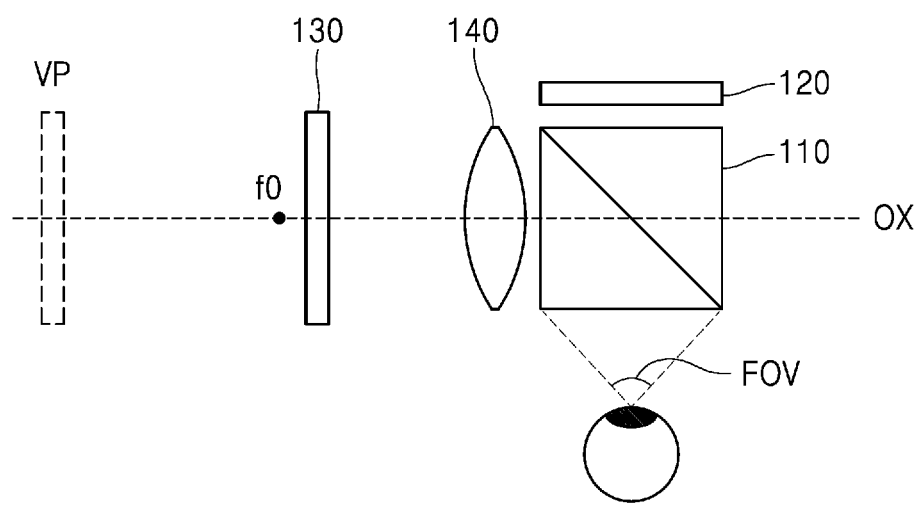
FIGS. 6A and 6B are views illustrating an example in which the depth of a virtual image plane is varied according to variations in the position of an image forming device.
Figure 6B:
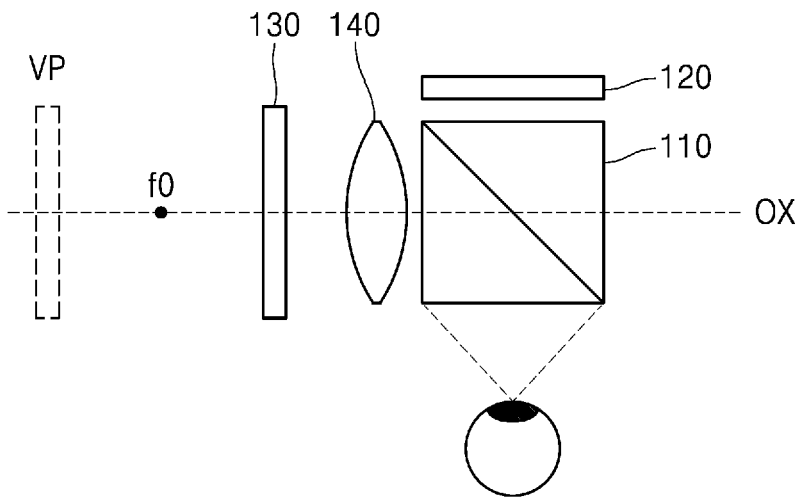

FIGS. 6A and 6B are example views illustrating variations in the depth of the virtual image plane VP according to variations in the position of the image forming device 130. Referring to FIGS. 6A and 6B, the image forming device 130 may be movable between the focusing optical system 140 and the object-side focal point f0 of the focusing optical system 140 along the optical axis OX of the focusing optical system 140. When the image forming device 130 is arranged between the object-side focal point f0 of the focusing optical system 140 and the focusing optical system 140, an erect virtual image is formed at the object side of the focusing optical system 140. Referring to FIGS. 6A and 6B, as the image forming device 130 approaches the object-side focal point f0 of the focusing optical system 140, the virtual image plane VP on which the erect virtual image is formed moves away from the focusing optical system 140, and as the image forming device 130 approaches the focusing optical system 140, the virtual image plane VP moves close to the focusing optical system 140. As described above, the depth of the virtual image plane VP may be determined by the position of the image forming device 130 with respect to 140, the focusing optical system between the object-side focal point f0 of the focusing optical system 140 and the focusing optical system 140.

This phenomenon may be explained by the lens focus equation of $1/a+1/b=1/f$. Here, "a" refers to the distance between an object and a lens, "b" refers to the distance between an image and the lens, and "f" refers to the focal length of the lens. When a is less than f, b is negative, and when b is negative, an erect virtual image is formed at the object side of the lens. In addition, when a and f are very close to each other, the value of b varies greatly even through the value of a varies slightly. Therefore, even when the displacement of the image forming device 130 near the object-side focal point f0 of the focusing optical system 140 is small, the position of the virtual image plane VP may vary significantly.

In FIGS. 6A and 6B, it is shown that the virtual image plane VP moves along the optical axis OX of the focusing optical system 140 for ease of description. However, since a virtual image is reflected at an angle of about 90 degrees by the combiner 110 and is then incident on a viewer's eye, the viewer's eye feels that the depth of the virtual image varies at the front side in directions perpendicular to the optical axis OX of the focusing optical system 140.

Figure 7A:
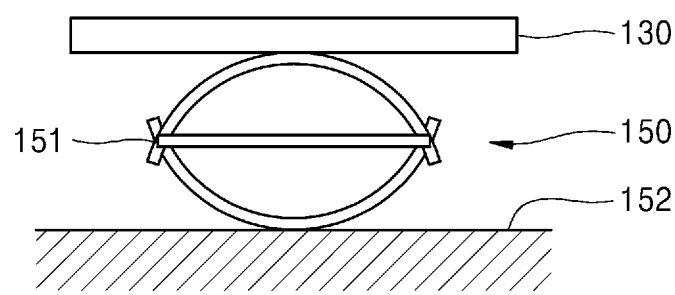
FIGS. 7A and 7B are views schematically illustrating an example structure and operation of a driving device according to an example embodiment.
Figure 7B:
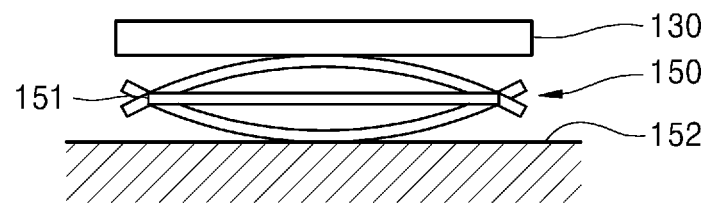

FIGS. 7A and 7B are view schematically illustrating an example structure and operation of the driving device 150 according to an example embodiment. Referring to FIGS. 7A and 7B, the driving device 150 may include an actuator 151, which is operable by electrical control and a support 152, which fixes and supports the actuator 151. The image forming device 130 may be arranged on a side of the actuator 151, and the position of the image forming device 130 may be varied according to the motion of the actuator 151.

For example, the actuator 151 may include two elastic bridges, which have surfaces convexly curved in opposite directions and a variable length element which is fixed between ends of the two elastic bridges. The variable length element has a length which is variable by electrical control. For example, the variable length element may include a material such as a shape memory alloy (SMA) or an electroactive polymer. According to an example embodiment, the shape of the variable length element may be changed to a predetermined shape by a certain driving signal. In this case, as shown in FIG. 7A, when the length of the variable length element is reduced, the two elastic bridges are relatively greatly bent, and thus the distance between the image forming device 130 and the focusing optical system 140 is reduced. In addition, as shown in FIG. 7B, when the length of the variable length element is increased, the two elastic bridges are less bent, and thus the distance between the image forming device 130 and the focusing optical system 140 is increased.

The actuator 151 illustrated in FIGS. 7A and 7B is merely an example for clear understanding, and the structure of the driving device 150 is not limited to the actuator 151 illustrated in FIGS. 7A and 7B. For example, the driving device 150 may include various electric devices capable of changing positions by electrical control such as a linear motor.

Figure 8:
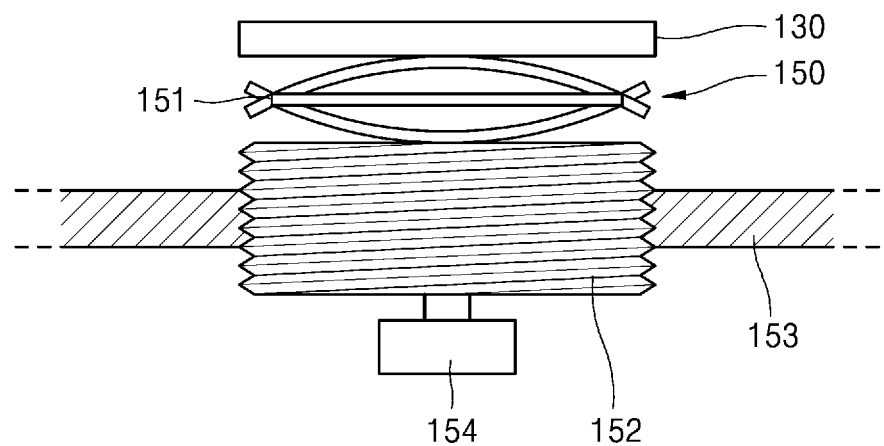
FIG. 8 is a view schematically illustrating an example structure of a driving device according to another example embodiment.

FIG. 8 is a view schematically illustrating an example structure of a driving device 150 according to another example embodiment. Referring to FIG. 8, a support 152 may be moved relative to a fixing frame 153 to adjust the position of an actuator 151. For example, the processor 160 may adjust the positions of the actuator 151 and the image forming device 130 by moving the support 152 using a motor 154 according to a viewer's eye. Alternatively, a viewer may manually move the support 152. In this case, a reference depth of the virtual image plane VP may be adjusted according to the state of a viewer's eye by adjusting the position of the support 152, and the driving device 150 may adjust the position of the image forming device 130 to perform depth expression according to information on the depth of a virtual image based on the determined reference depth of the virtual image plane VP.

Figure 9:
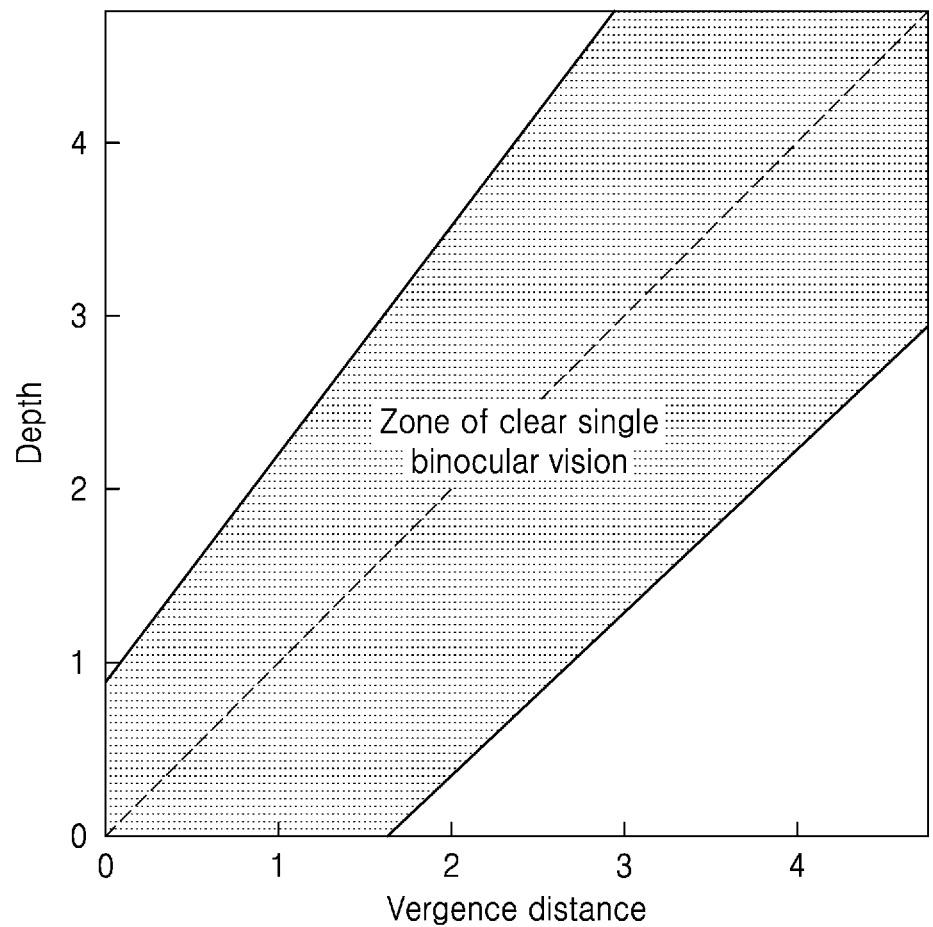
FIG. 9 is a graph illustrating that a viewer may clearly see an object when the difference between the depth of a virtual image plane and the vergence distance of viewer's eyes is within a certain range.

In addition, even myopic viewers may have different degrees of myopia, and hyperopic viewers may have different degrees of hyperopia. However, according to human's visual perception characteristics, it is not necessary to precisely control the depth of the virtual image plane VP according to various eye conditions. For example, FIG. 9 is a graph illustrating that a viewer may clearly see an object when the difference between the depth of the virtual image plane VP and the vergence distance of the eyes of the viewer is within a certain range. In FIG. 9, the dashed line refers to points at which the depth of the virtual image plane VP and the vergence distance of the viewer's eyes exactly match each other. Furthermore, in FIG. 9, the lower solid line refers to the minimum of the depth of the virtual image plane VP for clearly viewing images at a given vergence distance or the maximum of the vergence distance for clearly viewing images at a given depth of the virtual image plane VP, and the upper solid line refers to the maximum of the depth of the virtual image plane VP for clearly viewing images at a given vergence distance or the minimum of the vergence distance for clearly viewing images at a given depth of the virtual image plane VP. The lower solid line refers to the line on the right side of the dashed line and the upper solid line refers to the line on the left side of the dashed line in FIG. 9. When the depth of the virtual image plane VP and the vergence distance of the viewer's eyes are within the region between the two solid lines shown in FIG. 9, viewers may clearly see virtual images.

Figure 10:
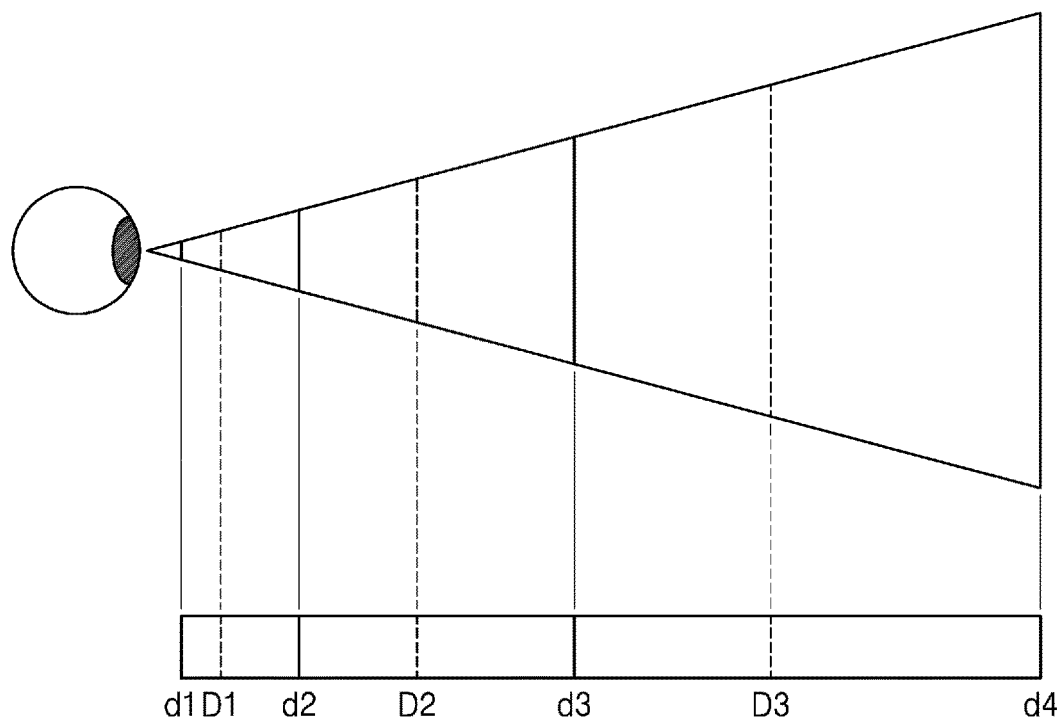
FIG. 10 is a view illustrating an example in which a plurality of discontinuous representative depth values are set for the depth of a virtual image plane by considering the graph of FIG. 9.

Therefore, the depth of the virtual image plane VP may be divided into a plurality of sections, and a plurality of discontinuous representative depth values respectively representing the sections may be set. FIG. 10 shows an example in which a plurality of discontinuous representative depth values are set for the depth of the virtual image plane VP by considering the graph of FIG. 9. For example, the depth of the virtual image plane VP may be divided into a first section from d1 to d2, a second section from d2 to d3, and a third section from d3 to d4; and D1 may be set as a representative depth value of the first section, D2 may be set as a representative depth value of the second section, and D3 may be set as a representative depth value of the third section. The processor 160 may store information about a plurality of discontinuous representative depth values respectively set for a plurality of predetermined sections and information about a plurality of predetermined discontinuous positions of the image forming device 130 which respectively correspond to the representative depth values.

A viewer may input his or her eye state such as myopia, emmetropia, or hyperopia through an input panel of the display apparatus 100. The processor 160 may select one of the plurality of representative depth values based on the eye state input by the viewer and may determine the selected representative depth value as the depth value of the virtual image plane VP. For example, D1 may be determined as the depth value of the virtual image plane VP when the viewer has myopia, D2 may be determined as the depth value of the virtual image plane VP when the viewer has emmetropia, and D3 may be determined as the depth value of the virtual image plane VP when the viewer has hyperopia. The processor 160 may control the driving device 150 to place the image forming device 130 at a position corresponding to the determined depth of the virtual image plane VP. In the example shown in FIG. 10, the depth of the virtual image plane VP is divided into three sections, and three representative depth values are set, but embodiments are not limited thereto. For example, the depth of the virtual image plane VP may be divided into four or more sections, and four or more representative depth values may be set.

In addition, the processor 160 may control the driving device 150 to continuously vary the position of the image forming device 130 according to the state of viewer's eyes. For example, the viewer may input a command to the processor 160 through the input panel to continuously increase or decrease the depth of the virtual image plane VP, and in response to the command, the processor 160 may control the driving device 150 to continuously move the image forming device 130. When the viewer selects a depth of the virtual image plane VP that is determined to be optimal for the viewer's eyes, the processor 160 may store the depth of the virtual image plane VP selected by the viewer or a position of the image forming device 130 corresponding thereto.

Figure 11:
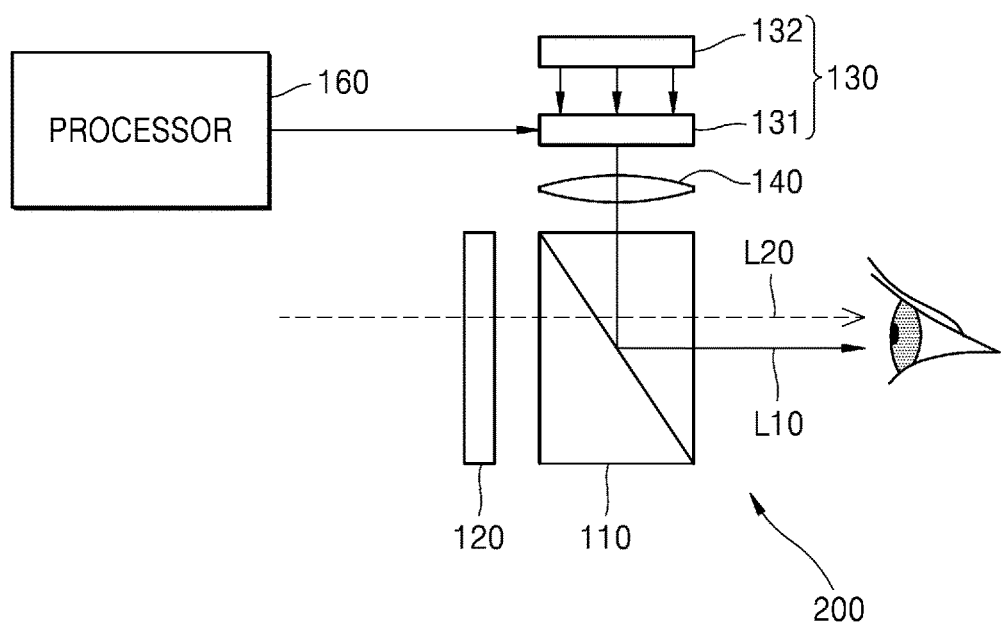
FIG. 11 is a conceptual view schematically illustrating a structure and operation of a display apparatus according to another example embodiment.

FIG. 11 is a conceptual view schematically illustrating a structure and operation of a display apparatus 200 according to another example embodiment. Referring to FIG. 11, the display apparatus 200 may include a combiner 110, a vision correction lens 120, an image forming device 130, a focusing optical system 140, and a processor 160. The image forming device 130 may include a light source 132 configured to emit collimated coherent illumination light, and a spatial light modulator 131 configured to generate a holographic image by diffracting and modulating the illumination light. The processor 160 may generate a hologram data signal that contains image information about a virtual image and depth information about the virtual image and may provide the holographic data signal to the spatial light modulator 131 of the image forming device 130.

The spatial light modulator 131 may display a hologram pattern according to the hologram data signal, such as a computer-generated hologram (CGH) signal, which is provided from the processor 160. Light emitted from the light source 132 to the spatial light modulator 131 may be diffracted by the hologram pattern displayed on a screen of the spatial light modulator 131 and may then form a three-dimensional holographic image by destructive interference and constructive interference. The spatial light modulator 131 may include any one of a phase modulator capable of performing only phase modulation, an amplitude modulator capable of performing only amplitude modulation, and a composite modulator capable of performing both phase modulation and amplitude modulation.

The light source 132 may be a coherent light source configured to emit coherent light. For example, a laser diode (LD) may be used as the light source 132 to provide light having high coherence. In addition, the light source 132 may be a light emitting diode (LED). Although LEDs emit light having lower spatial coherence than laser light, light having only a certain degree of spatial coherence may be sufficiently diffracted and modulated by the spatial light modulator 131. Instead of an LED, any other light source capable of emitting coherent light may be used as the light source 132.

In the display apparatus 100 illustrated in FIG. 1, the depth of the virtual image plane VP is adjusted by directly varying the physical position of the image forming device 130 using the driving device 150. However, in the display apparatus 200 illustrated in FIG. 11, the depth of a holographic image formed through the spatial light modulator 131 may be adjusted only by a CGH signal provided to the spatial light modulator 131. The processor 160 may determine the depth of a virtual image plane VP according to the state of the eyes of a viewer and may generate a CGH signal having depth information corresponding to the determined depth of the virtual image plane VP to provide the CGH signal to the spatial light modulator 131. Alternatively, the processor 160 may generate a CGH signal having depth information corresponding to a depth of the virtual image plane VP selected by a viewer and may provide the CGH signal to the spatial light modulator 131. In this case, the processor 160 may function as a virtual image positioner that adjusts, according to the state of the viewer's eyes, the depth of the virtual image plane VP at which virtual images are viewed.

Figure 12:
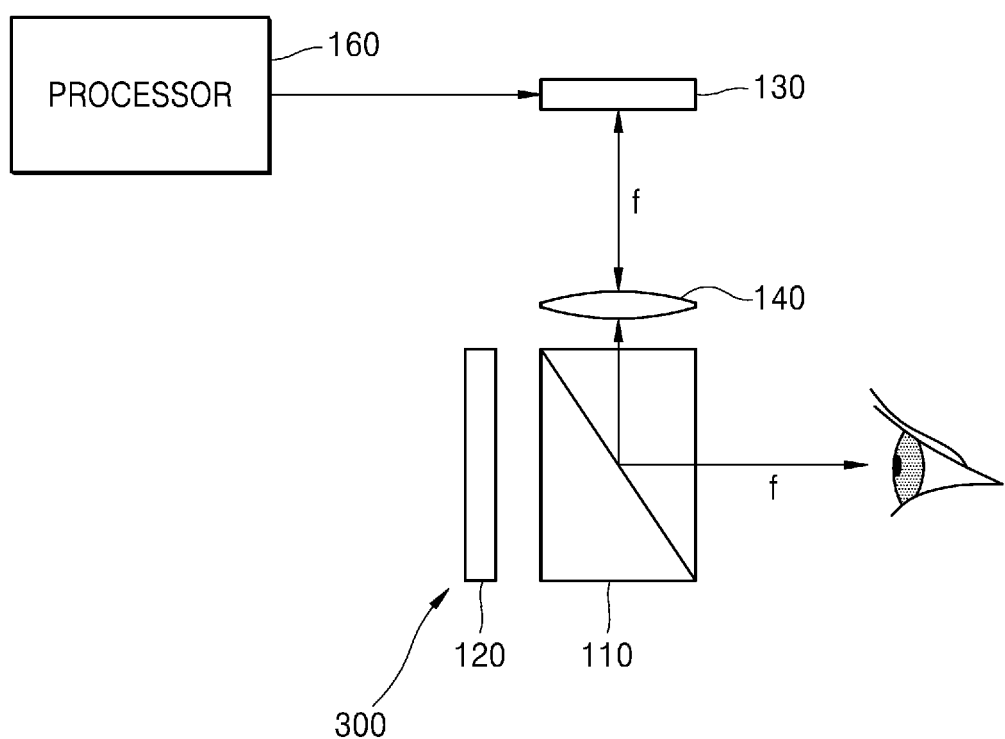
FIG. 12 is a conceptual view schematically illustrating a structure and operation of a display apparatus according to another example embodiment.

FIG. 12 is a conceptual view schematically illustrating a schematic structure and operation of a display apparatus 300 according to another example embodiment. Referring to FIG. 12, the display apparatus 300 may include a combiner 110, a vision correction lens 120, an image forming device 130, a focusing optical system 140, and a processor 160. In each of the display apparatuses 100 and 200 illustrated in FIGS. 1 and 11, the depth of the virtual image plane VP is adjusted according to the state of viewer's eyes. However, the display apparatus 300 illustrated in FIG. 12 may provide a virtual image which is in focus at all depths. When providing a virtual image which is in focus at all depths regardless of the state of viewer's eyes, it is not necessary to adjust the depth of a virtual image plane VP according to viewers.

To this end, in the display apparatus 300 illustrated in FIG. 12, the image forming device 130 may be positioned at the object-side focal point of the focusing optical system 140. In addition, the display apparatus 300 may be configured such that viewer's eyes are positioned at the image-side focal point of the focusing optical system 140. Then, parallel light containing a virtual image provided from the image forming device 130 may always be focused on the viewer's retinas regardless of the state of the viewer's eyes. In this regard, the focusing optical system 140, which is arranged between the image forming device 130 and the combiner 110 and transmits a virtual image in a state in which the virtual image is in focus at all depths regardless of the state of the viewer's eyes, may function as a virtual image positioner.

Figure 13:
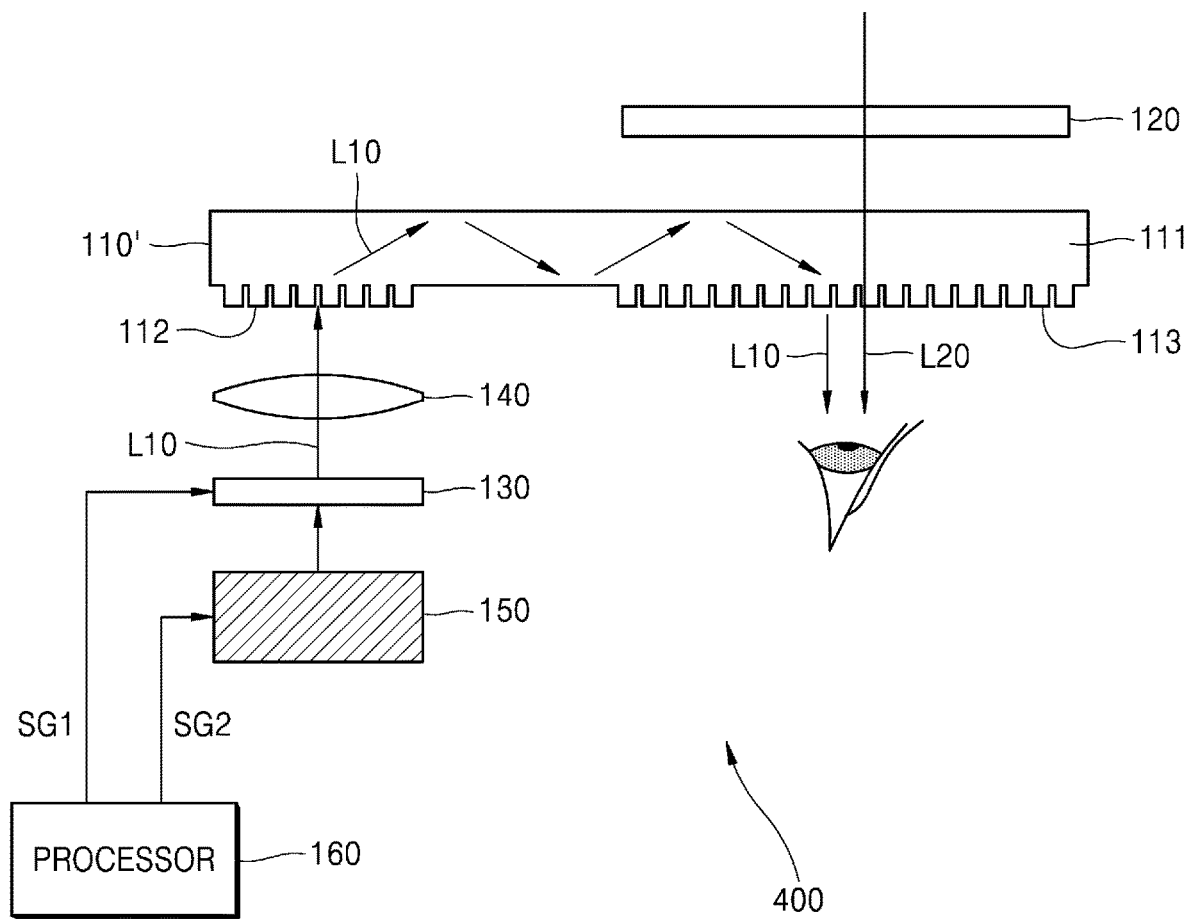
FIG. 13 is a conceptual view schematically illustrating a structure and operation of a display apparatus according to another example embodiment.

Until now, it has been described that the combiner 110 is a beam splitter, but the combiner 110 may be configured using various optical elements other than a beam splitter according to another example embodiment. For example, FIG. 13 is a conceptual view schematically illustrating a structure and an operation of a display apparatus 400 according to another example embodiment. Referring to FIG. 13, a combiner 110' of the display apparatus 400 may include a light guide plate 111.

The light guide plate 111 may include a material transparent to visible light to serve as an optical waveguide which delivers light. For example, the light guide plate 111 may include a material such as glass, polymethylmethacrylate (PMMA), or polydimethylsiloxane (PDMS). In addition, the light guide plate 111 may have a flat and even plate shape. An input coupler 112, configured to guide incident light obliquely to the inside of the light guide plate 111, and an output coupler 113, configured to output light propagating obliquely in the light guide plate 111 to the outside of the light guide plate 111, may be arranged on a surface of the light guide plate 111.

The input coupler 112 may be configured such that light incident on the light guide plate 111 in a direction substantially orthogonal to the input coupler 112 may be obliquely guided to the inside of the light guide plate 111. For example, the input coupler 112 may be configured such that light incident on the input coupler 112 within a predetermined incident angle range with respect to a direction orthogonal to the surface of the input coupler 112 may be guided to the inside of the input coupler 112. Light guided into the light guide plate 111 propagates along the inside of the light guide plate 111 by total reflection. The output coupler 113 is configured such that light obliquely incident on the output coupler 113 may be output to the outside of the light guide plate 111 in a direction substantially orthogonal to the light guide plate 111. The output coupler 113 may be configured to act only on light which is obliquely incident on the surface of the output coupler 113 within a predetermined incident angle range and not to act on light which is perpendicularly incident on the surface of the output coupler 113. In other words, the output coupler 113 may simply act as a transparent plate for light incident perpendicularly on the surface of the output coupler 113.

Each of the input coupler 112 and the output coupler 113 may include a diffractive optical element (DOE) or a holographic optical element (HOE). The DOE includes a plurality of periodic fine grating patterns. The grating patterns of the DOE act as a diffraction grating which diffracts incident light. In particular, according to the size, height, period, etc. of the grating patterns, light incident within a predetermined angle range may be diffracted and subjected to destructive interference and constructive interference, and thus, the propagation direction of the light may be changed. In addition, the HOE includes periodic fine patterns of materials having different refractive indexes instead of including grating patterns. The HOE may be different only in structure from the DOE and may have the same operating principle as the DOE.

The image forming device 130 may be arranged at a position corresponding to the input coupler 112 of the light guide plate 111, and the vision correction lens 120 may be arranged at a position corresponding to the output coupler 113 of the light guide plate 111. In addition, the vision correction lens 120 and the image forming device 130 may be arranged on opposite surfaces of the light guide plate 111. For example, the vision correction lens 120 is arranged on a surface of the light guide plate 111 which is opposite to a surface of the light guide plate 111 facing viewer's eyes, and the image forming device 130 may be arranged on the surface of the light guide plate 111 facing the viewer's eyes. Therefore, light L10 containing a virtual image may pass through the input coupler 112 and the inside of the light guide plate 111 and may then be provided to the viewer's eyes through the output coupler 113. Light L20 containing an outside landscape which is in front of the viewer may pass through the vision correction lens 120 and the output coupler 113 and may then be provided to the viewer's eyes.

Figure 14:
FIGS. 14 to 16 are views illustrating various electronic devices which employ display apparatuses including vision correction lenses according to example embodiments.
Figure 15:
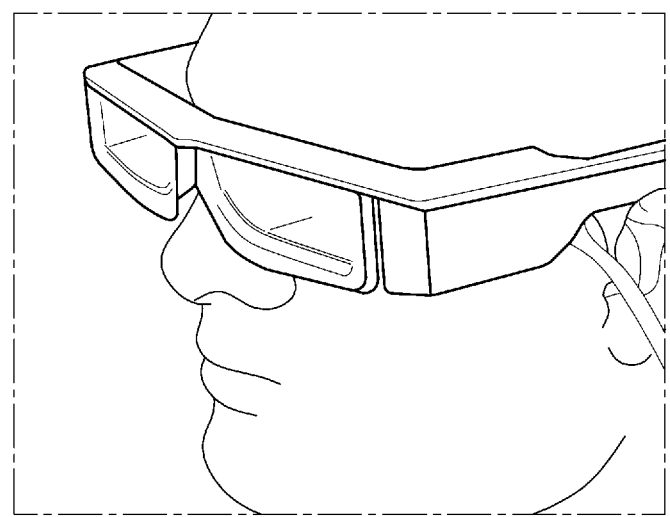
Figure 16:
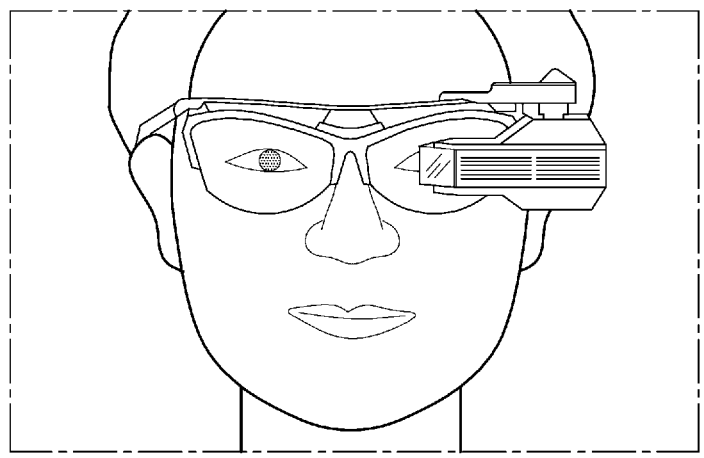

As described above, the display apparatuses of the example embodiments may be used to implement AR or MR. For example, FIGS. 14 to 16 are views illustrating various electronic devices employing the display apparatuses of the above-described embodiments. As illustrated in FIGS. 14 to 16, the display apparatuses may constitute wearable devices. In other words, the display apparatuses may be applied to wearable devices. For example, the display apparatuses may be applied to head mounted displays (HMDs). In addition, the display apparatuses may be applied to glasses-type displays, goggle-type displays, or the like. The wearable electronic devices shown in FIGS. 14 to 16 may be operated in an interacting relationship with smartphones. The display apparatuses may be head-mounted, glasses-type, or goggle-type VR display apparatuses, AR display apparatuses, or MR display apparatuses which are capable of providing VR or providing virtual images together with real images of the outside.

While the display apparatuses including vision correction lenses have been described according to example embodiments with reference to the accompanying drawings, the example embodiments are merely examples, and it will be understood by those of ordinary skill in the art that various modifications and other equivalent embodiments may be made therein. Therefore, the example embodiments described herein should be considered in a descriptive sense only and not for purposes of limitation. The scope of the disclosure is defined not by the above description but by the following claims, and all differences within equivalent ranges of the scope of the disclosure should be considered as being included in the scope of the disclosure.

It should be understood that example embodiments described herein should be considered in a descriptive sense only and not for purposes of limitation. Descriptions of features or aspects within each example embodiment should typically be considered as available for other similar features or aspects in other example embodiments. While one or more example embodiments have been described with reference to the figures, it will be understood by those of ordinary skill in the art that various changes in form and details may be made therein without departing from the spirit and scope as defined by the following claims.

What is claimed is:

1. A display apparatus comprising:
an image forming device configured to form a virtual image;
a vision correction lens configured to correct eyesight of a viewer;
a combiner configured to mix the virtual image with a real-world image in a surrounding environment that passes through the vision correction lens and provide the viewer with the virtual image and the real-world image that are mixed with each other; and
a virtual image positioner configured to adjust, according to a state of eyes of the viewer, a depth of a virtual image plane at which the virtual image is viewed,
wherein the combiner is arranged between the vision correction lens and the eyes of the viewer,
wherein the virtual image positioner comprises:
a focusing optical system arranged between the image forming device and the combiner;
a driving device configured to adjust a distance between the image forming device and the focusing optical system; and
a processor configured to control the driving device,
wherein the virtual image positioner is configured to adjust, according to the state of the eyes of the viewer, the depth of the virtual image plane at which the virtual image is viewed,
wherein the depth of the virtual image plane is determined based on a position of the image forming device with respect to the focusing optical system, and
wherein the processor is further configured to:
store information on a plurality of discontinuous positions, and
control the driving device to place the image forming device at one of the plurality of discontinuous positions according to the state of the eyes of the viewer.

2. The display apparatus of claim 1, wherein the virtual image positioner is configured such that the depth of the virtual image plane matches a depth of an object in the real-world image in the surrounding environment that is corrected by the vision correction lens.

3. The display apparatus of claim 1, wherein the virtual image positioner is configured to
position the virtual image plane at a first distance from the eyes of the viewer based on a determination that the eyes of the viewer are myopic;
position the virtual image plane at a second distance from the eyes of the viewer based on a determination that the eyes of the viewer are emmetropic, the second distance being greater than the first distance; and
position the virtual image plane at a third distance from the eyes of the viewer based on a determination that the eyes of the viewer are hyperopic, the third distance being greater than the second distance.

4. The display apparatus of claim 1, wherein the vision correction lens is a lens having negative (−) refractive power, a flat plate having zero refractive power, or a lens having positive (+) refractive power.

5. The display apparatus of claim 1, wherein the image forming device is movable along an optical axis of the focusing optical system between the focusing optical system and an object-side focal point of the focusing optical system.

6. The display apparatus of claim 1, wherein the driving device comprises an actuator configured to be operated by electrical control.

7. The display apparatus of claim 6, wherein the driving device further comprises a support configured to fix the actuator.

8. The display apparatus of claim 7, wherein the support is movable to adjust a position of the actuator.

9. The display apparatus of claim 1, wherein the processor is further configured to control the driving device to additionally adjust the position of the image forming device according to depth information about the virtual image based on the determined depth of the virtual image plane.

10. The display apparatus of claim 1, wherein the processor is further configured to provide the image forming device with a light modulation signal including information about the virtual image.

11. The display apparatus of claim 1,
wherein the focusing optical system is configured to transmit the virtual image in a state in which the virtual image is in focus at all depths regardless of the state of the eyes of the viewer.

12. The display apparatus of claim 11, wherein the image forming device is positioned at an object-side focal point of the focusing optical system.

13. The display apparatus of claim 1, wherein the combiner comprises a beam splitter configured to reflect, toward the eyes of the viewer, the virtual image formed by the image forming device, and transmit, toward the eyes of the viewer, the real-world image in a surrounding environment passed through the vision correction lens.

14. The display apparatus of claim 1, wherein the combiner comprises a light guide plate, and the light guide plate comprises an input coupler and an output coupler.

15. The display apparatus of claim 14, wherein the image forming device is arranged at a position corresponding to the input coupler of the light guide plate, and the vision correction lens is arranged at a position corresponding to the output coupler of the light guide plate.

16. The display apparatus of claim 15, wherein the output coupler is configured such that light obliquely incident on the output coupler from an inside of the light guide plate is output to an outside of the light guide plate, and light perpendicularly incident on the output coupler passes through the output coupler.

17. A display apparatus comprising:
an image forming device configured to form a virtual image;
a vision correction lens configured to correct eyesight of a viewer;
a combiner configured to mix the virtual image with a real-world image in a surrounding environment that passes through the vision correction lens and provide the viewer with the virtual image and the real-world image that are mixed with each other; and
a virtual image positioner configured to adjust, according to a state of eyes of the viewer, a depth of a virtual image plane at which the virtual image is viewed,
wherein the combiner is arranged between the vision correction lens and the eyes of the viewer,
wherein the image forming device comprises:
a light source configured to emit coherent illumination light; and
a spatial light modulator configured to generate a holographic image by diffracting and modulating the illumination light.

18. The display apparatus of claim 17, wherein
the virtual image positioner comprises a processor configured to generate a computer-generated hologram (CGH) signal containing image information about the virtual image and depth information about the virtual image and provide the CGH signal to the image forming device,
wherein the virtual image positioner is configured to adjust, according to the state of the eyes of the viewer, the depth of the virtual image plane at which the virtual image is viewed.

19. The display apparatus of claim 18, wherein the processor is further configured to determine the depth of the virtual image plane according to the state of the eyes of the viewer, and change the CGH signal according to the determined depth of the virtual image plane.

20. A wearable electronic device comprising:
an image forming device configured to form a virtual image;
a vision correction lens configured to correct eyesight of a viewer, the vision correction lens having an outer surface facing a surrounding environment of the viewer and an inner surface facing eyes of the viewer;
a combiner arranged on the inner surface of the vision correction lens, the combiner configured to mix the virtual image from the image forming device with a real-world image in the surrounding environment that passes through the vision correction lens;
a focusing optical system arranged between the image forming device and the combiner;
a driving device configured to adjust a distance between the image forming device and the focusing optical system; and
a processor configured to control the driving device,
wherein the processor is configured to adjust, according to a state of the eyes of the viewer, a depth of a virtual image plane at which the virtual image is viewed,
wherein the depth of the virtual image plane is determined based on a position of the image forming device with respect to the focusing optical system, and
wherein the processor is further configured to:
store information on a plurality of discontinuous positions, and
control the driving device to place the image forming device at one of the plurality of discontinuous positions according to the state of the eyes of the viewer.

* * * * *